(12) United States Patent
Imam et al.

(10) Patent No.: US 7,944,149 B2
(45) Date of Patent: May 17, 2011

(54) STARTING AN ELECTRONIC BALLAST

(75) Inventors: Afroz M. Imam, Danvers, MA (US); Sivakumar Thangavelu, Billerica, MA (US); Mustansir Kheraluwala, Lake Zurich, IL (US)

(73) Assignee: Osram Sylvania Inc., Danvers, MA (US)

( * ) Notice: Subject to any disclaimer, the term of this patent is extended or adjusted under 35 U.S.C. 154(b) by 256 days.

(21) Appl. No.: 12/464,427

(22) Filed: May 12, 2009

(65) Prior Publication Data

US 2010/0289421 A1    Nov. 18, 2010

(51) Int. Cl.
*H05B 37/02* (2006.01)

(52) U.S. Cl. ............... 315/209 R; 315/224; 315/291

(58) Field of Classification Search ........... 315/200 R, 315/209 R, 224–226, 276, 283, 291, 307, 315/308, DIG. 7
See application file for complete search history.

(56) References Cited

U.S. PATENT DOCUMENTS

| 6,593,703 B2* | 7/2003 | Sun ............... 315/224 |
| 7,170,235 B2* | 1/2007 | Van Casteren ........ 315/224 |
| 7,425,802 B2* | 9/2008 | Kumagai et al. ........ 315/291 |
| 2006/0049777 A1* | 3/2006 | Kumagai et al. ........ 315/224 |

* cited by examiner

*Primary Examiner* — Jacob Y Choi
*Assistant Examiner* — Jimmy T Vu
(74) *Attorney, Agent, or Firm* — Shaun P. Montana

(57) ABSTRACT

A ballast including an H-bridge type inverter for driving a lamp and a filter circuit that includes a buck inductor is disclosed. The buck inductor is a primary winding of a transformer, and a secondary winding of the transformer provides power to a controller of the ballast. The controller operates the inverter in various pre-ignition modes of operation such that prior to ignition, the open circuit voltage (OCV) (i.e., voltage across the lamp) and buck inductor current are controlled to transfer sufficient power from the primary of the transformer to the secondary winding of the transformer to power the controller. No switches of the inverter are turned on while there is a non-zero current through the filter circuit.

21 Claims, 4 Drawing Sheets

STARTING AN ELECTRONIC BALLAST

FIELD OF THE INVENTION

The present invention generally relates to electronic ballasts for controlling the current through a light source. More particularly, the invention is concerned with providing an open circuit voltage to a light source prior to ignition of the light source while inducing a total current in a primary winding of a transformer of the ballast sufficient to power a controller of the ballast from a secondary winding of the transformer.

BACKGROUND OF THE INVENTION

Gas discharge lamps such as high intensity discharge (HID) lamps generally have high impedance prior to ignition (i.e., prior to run-up and steady state operation). Prior to ignition, a ballast powering the lamp subjects the lamp to short duration, high voltage ignition pulses while providing an open circuit voltage to the lamp. The ignition pulses ionize (i.e., break down) gaseous particles inside a capillary of the lamp. The open circuit voltage is generally an alternating current (AC) voltage and is required in order to sustain lamp break down (i.e., ionization of gaseous particles in the capillary) until the ballast detects that the lamp has ignited and provide steady state operation to the lamp.

SUMMARY OF THE INVENTION

Aspects of the invention include an electronic ballast and method for providing an open circuit voltage (OCV) to the lamp during a pre-ignition mode of operation prior to and immediately following ignition of the lamp (i.e., before a controller of the ballast can detect lamp ignition and switch to a run-up and steady state mode of operation). The ballast includes an H-bridge type inverter for driving the lamp and a filter circuit comprising a buck inductor. The buck inductor is a primary winding of a transformer, and a secondary winding of the transformer provides power to a controller of the ballast. The controller operates the inverter such that in the pre-ignition mode of operation, the OCV and buck inductor current are controlled to transfer sufficient power from the primary of the transformer to the secondary winding of the transformer to power the controller, and the controller does not turn on any switches of the inverter while there is a non-zero current through the filter circuit. Further, the ballast controls the OCV such that the switches of the inverter are not overstressed during the time period between ignition of the lamp and the ballast switching from the pre-ignition mode of operation to run-up and steady state operation of the lamp.

In one embodiment, a ballast provides power to a lamp. The ballast comprises a direct current (DC) bus, a first switch, a second switch, a third switch, a fourth switch, and a filter circuit. The DC bus includes a positive node and a negative node. The first switch comprises a high side, a control terminal, and a low side. The high side of the first switch is connected to the positive node of the DC bus. The second switch has a high side, a control terminal, and a low side. The low side of the second switch is connected to the negative node of the DC bus. The high side of the second switch is connected to the low side of the first switch forming a first midpoint. The third switch has a high side, a control terminal, and a low side. The high side of the third switch is connected to the positive node of the DC bus. The fourth switch has a high side, a control terminal, and a low side. The low side of the fourth switch is connected to the negative node of the DC bus. The high side of the fourth switch is connected to the low side of the third switch forming a second midpoint. The filter circuit is connected to the lamp and connected between the first midpoint and the second midpoint. In operation, a controller of the lamp operates the switches of the ballast to apply an OCV to the lamp from the ballast prior to ignition of the lamp. Thereafter, the controller cycles the first switch of the ballast to increase the OCV applied to the lamp from a negative peak voltage to zero volts. Cycling the first switch reduces an absolute value of a rate of change of the OCV applied to the lamp. Thereafter, the controller maintains the fourth switch of the ballast in an ON state while cycling the first switch to increase the OCV applied to the lamp from zero volts to a positive peak voltage. Maintaining the fourth switch in the ON state while cycling the first switch reduces the absolute value of the rate of change of the OCV applied to the lamp. Thereafter, the controller cycles the second switch of the ballast to decrease the OCV applied to the lamp from the positive peak voltage to zero volts. Cycling the second switch reduces the absolute value of the rate of change of the OCV applied to the lamp. Thereafter, the controller maintains the third switch in an ON state while cycling the second switch to decrease the OCV applied to the lamp from zero volts to the negative peak voltage. Maintaining the third switch in the ON state while cycling the second switch reduces the absolute value of the rate of change of the OCV applied to the lamp.

In one embodiment, providing an open circuit voltage (OCV) across a lamp prior to ignition of the lamp is disclosed. A ballast for providing the OCV comprises a direct current (DC) bus, a controller, a first switch, a second switch, a third switch, a fourth switch, and a filter circuit. The filter circuit includes a buck capacitor and a buck inductor. Each of the switches has a control terminal, a high side, and a low side. The controller controls each of the switches via their respective control terminals. The controller begins by cycling the first switch to discharge a negative voltage from the buck capacitor in a first pre-ignition mode of operation. Thereafter, the controller cycles the first switch of the ballast to accumulate a positive voltage in the buck capacitor in a second pre-ignition mode of operation. In the second pre-ignition mode, the controller holds a fourth switch of the ballast in an ON state. Thereafter, the controller cycles the second switch of the ballast to discharge the positive voltage from the buck capacitor in a third pre-ignition mode of operation. Thereafter, the controller cycles the second switch of the ballast to accumulate a negative voltage in the buck capacitor in a fourth pre-ignition mode of operation. In the fourth pre-ignition mode, the third switch is held in an ON state. A primary winding of a transformer is the buck inductor, and the controller receives power from a secondary winding of the transformer.

In general, the invention is not limited to operating HID lamps. Aspects of the invention are also applicable to low pressure lamps (e.g., fluorescent), plasma processing, lasers (e.g., rare-gas, rare-gas ion, and excimer), and related systems, and can be used in any H-bridge type ballast.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
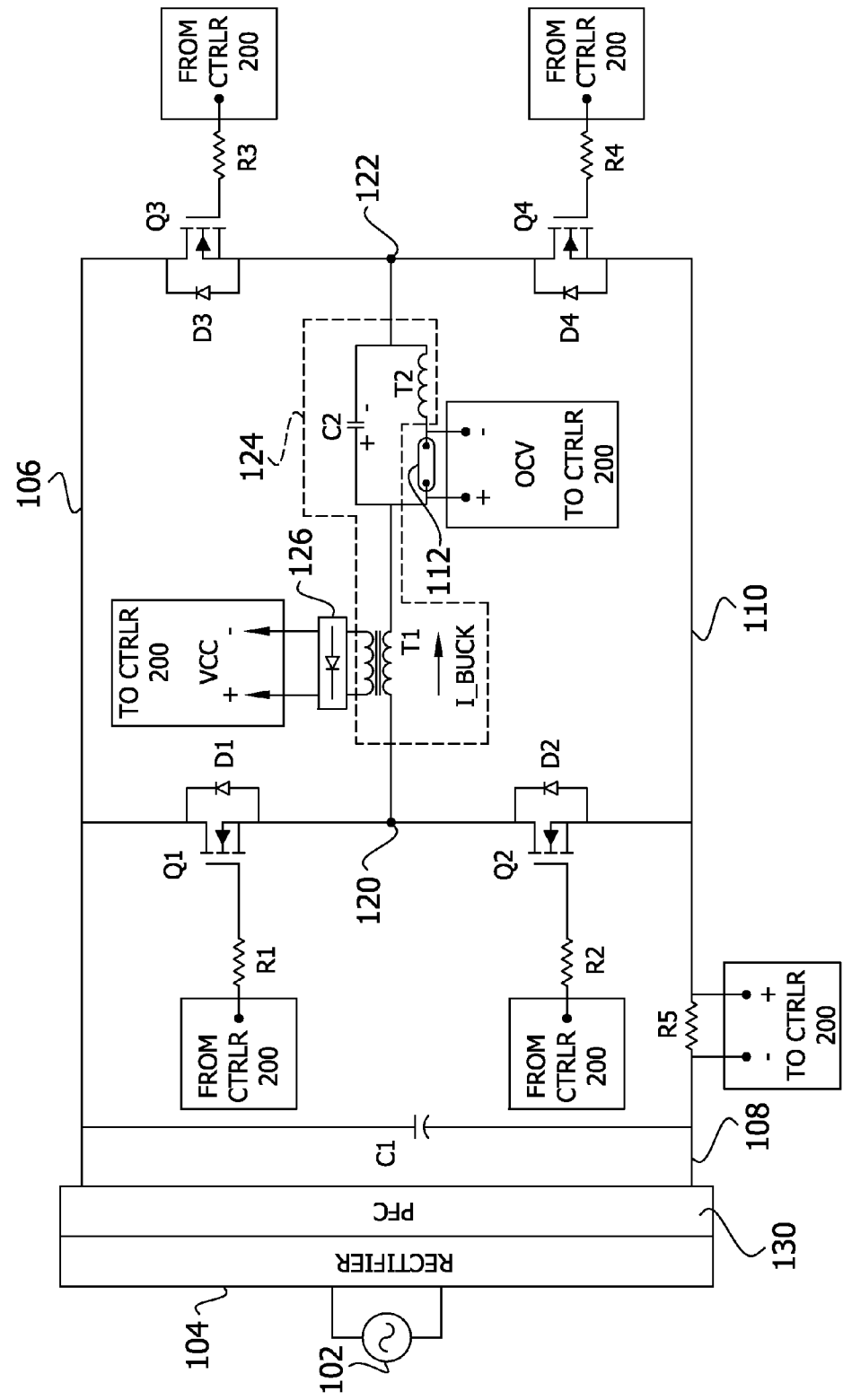
FIG. 1 is a schematic diagram, partially in block form, of an electronic ballast for powering a lamp according to one embodiment of the invention.

Referring to FIG. 1, an electronic ballast 100 receives power from an alternating current (AC) source 102 (e.g., standard 120V AC household power). A rectifier 104 converts the AC power to direct current (DC) power. The rectifier 104 has a positive output 106 and a negative output 108. Various optional components may be connected to or internal to the rectifier 104 for conditioning or altering the DC voltage output of the rectifier 104 including a bus capacitor C1, a voltage regulator (not shown), a voltage limiter (not shown), a power factor correction circuit (PFC) 130 and a DC to DC converter (not shown). In one embodiment, the DC bus voltage (i.e., the voltage difference between the positive output 106 and the negative output 108) is 465 volts. The DC bus comprises a positive node which is the positive output 106, of the rectifier 104, and a negative node 110 which is connected to the negative output of the rectifier 104 via a current sensing resistor R5. The current sensing resistor R5 in series with the negative output 108 enables a controller 200 of the ballast 100 to monitor a current of the ballast (e.g., an inverter current) to determine when a lamp 112 driven by the ballast 100 ignites so that the ballast 100 can transition from a pre-ignition mode of operation to a steady state mode of operation.

The ballast 100 includes an H-bridge inverter comprising a first switch Q1, a second switch Q2, a third switch Q3, and a fourth switch Q4 and freewheeling diodes D1, D2, D3, and D4, corresponding to and connected across each of the switches Q1, Q2, Q3, and Q4. In one embodiment, the switches Q1, Q2, Q3, and Q4 comprise mosfets. Each of the switches Q1, Q2, Q3, and Q4 has a high side, a low side, and a control terminal, and each of the freewheeling diodes has a cathode which is connected to the high side of the corresponding switch and an anode which is connected to the low side of the corresponding switch. In one embodiment, each of the switches Q1, Q2, Q3, and Q4 includes a blocking diode connected in series with a mosfet wherein a cathode of the blocking diode is connected to the high side of mosfet and the cathode of the corresponding freewheeling diode is connected to the anode of the corresponding blocking diode.

The high side of the first switch Q1 and the high side of the third switch Q3 are connected to the positive node 106 of the DC bus. The control terminal of first switch Q1 is connected to the controller 200 via a first resistor R1 and the control terminal of the third switch Q3 is connected to the controller 200 via a third resistor R3. The low side of the first switch Q1 is connected to the high side of the second switch Q2 to form a first midpoint 120, and the low side of the third switch Q3 is connected to the high side of the fourth switch Q4 to form a second midpoint 122. The low side of the second switch Q2 and the low side of the fourth switch Q4 are connected to the negative node 110 of the DC bus. The control terminal of the second switch Q2 is connected to the controller 200 via a second resistor R2, and the control terminal of the fourth switch Q4 is connected to the controller 200 via fourth resistor R4. In one embodiment, the controller 200 is connected to each of the switches Q1, Q2, Q3, and Q4 via a driver circuit and the corresponding resistor R1, R2, R3, and R4.

The ballast 100 also includes a filter circuit 124 connected between the first midpoint 120 and the second midpoint 122. Current through the filter circuit is AC, and by convention will be referred to herein as flowing in the positive direction from the first midpoint 120 to the second midpoint 122 as if the first midpoint 120 was a positive input to the filter circuit 124 and the second midpoint 122 was the common, ground, or negative terminal of the filter circuit 124. The filter circuit 124 includes a first transformer T1, a buck capacitor C2, and an igniter coil T2. The igniter coil T2 is the secondary winding of a second transformer used to provide short duration, high voltage ignition pulses to the lamp 112 prior to run-up and steady state operation. The first transformer T1 comprises a primary coil, also referred to as a buck inductor, and a secondary coil which provides power from the primary coil to the controller 200 via a second rectifier 126. The second rectifier 126 optionally includes components for voltage regulation. Various configurations of the filter circuit 124 are contemplated within the scope of the invention. In the embodiment of FIG. 1, the buck inductor (i.e., the primary winding of the first transformer T1) is connected to the first midpoint 120, the igniter coil T2 is connected to the second midpoint 122, and the lamp 112 is connected between the igniter coil T2 and the buck inductor. The buck capacitor C2 (i.e., a capacitor connected in series with the buck inductor T1) is connected in parallel with the lamp 112 and the igniter coil T2 (i.e., between the second midpoint 122 and the junction of the buck inductor to the lamp 112). In an alternative embodiment, the buck inductor is connected to the second midpoint 122 and the igniter coil T2 and buck capacitor C2 are connected to the first midpoint 120.

Figure 2:
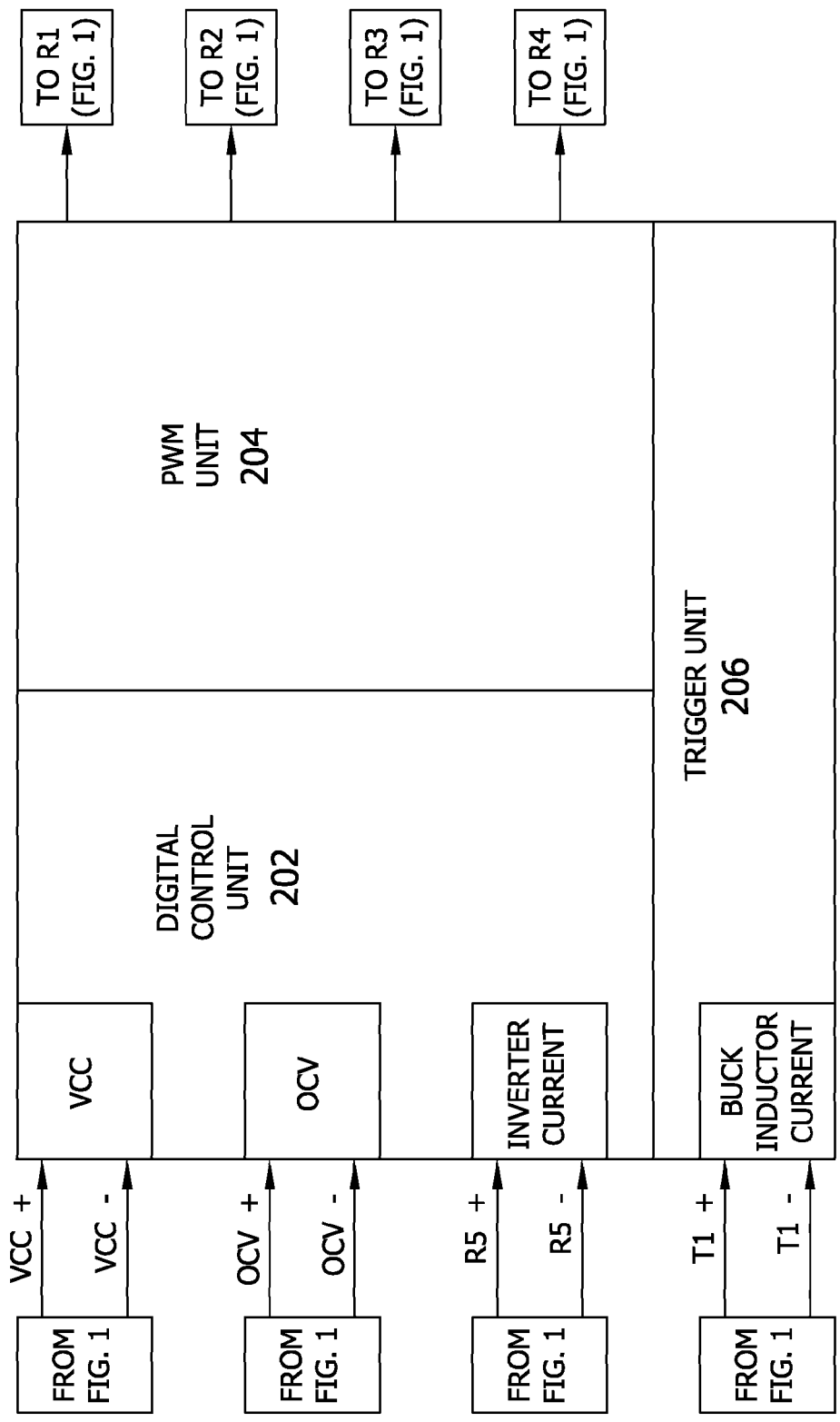
FIG. 2 is a block diagram of a controller for an electronic ballast as shown in FIG. 1 according to one embodiment of the invention.

Referring to FIG. 2, the controller 200 monitors the OCV by monitoring the voltage across the lamp 112. In one embodiment, the root mean square (RMS) of the OCV is about 280 volts prior to ignition of the lamp 112. In one embodiment, the controller 200 uses the OCV to determine when to switch between one of a plurality of pre-ignition operating modes further described below with respect to FIG. 3. In another embodiment, the controller 200 may monitor the OCV to determine ignition of the lamp 112. The controller 200 monitors an inverter current (i.e., a current through the H-bridge inverter) by monitoring a voltage across the current sense resistor R5. In one embodiment of the invention, the controller 200 determines the inverter current using a different current sensing method, and R5 is not needed. The inverter current is relatively small prior to ignition of the lamp 112 due to the high impedance of the lamp 112, and the controller 200 monitors the voltage across the current sense resistor R5 for a large increase indicative of ignition of the lamp 112. Upon detecting the increase in inverter current, the controller 200 switches the ballast 100 into run-up and steady state operation. The controller 200 monitors the voltage at the connection between the buck inductor T1 and the buck capacitor C2 to determine when a current through the buck inductor has fallen to zero so that the switches Q1, Q2, Q3, and Q4 are not turned on when there is a non-zero current, which could cause noise sufficient to interrupt operation of the controller 200, damaging the switches. The controller 200 has discrete outputs for each of the switches Q1, Q2, Q3, and Q4 connected to their respective control terminals for controlling whether the switch is in an OFF state (i.e., is not conducting electricity) or an ON state (i.e., is conducting electricity).

The controller 200 comprises a digital control unit 202, a pulse width modulation (PWM) unit 204, and a trigger unit

206. The digital control unit 202 determines the operating state of the ballast 100. That is, the digital control unit 202 determines which of a plurality of pre-ignition operating modes, a run-up operating mode, or a steady state operating mode to operate the ballast 100 in and provides a corresponding set of control parameters to the PWM unit 204. The PWM unit 204 controls the switches Q1, Q2, Q3, and Q4 as a function of the provided control parameters. As further described below with respect to FIG. 3, the trigger unit 206 provides a trigger signal to the PWM unit 204 as a function of the current through the buck inductor. In one embodiment, the trigger unit 206 provides the trigger signal when the current through the buck inductor falls to zero amperes, and the PWM unit 204 begins a next PWM cycle in response to receiving the trigger signal.

Figure 3:
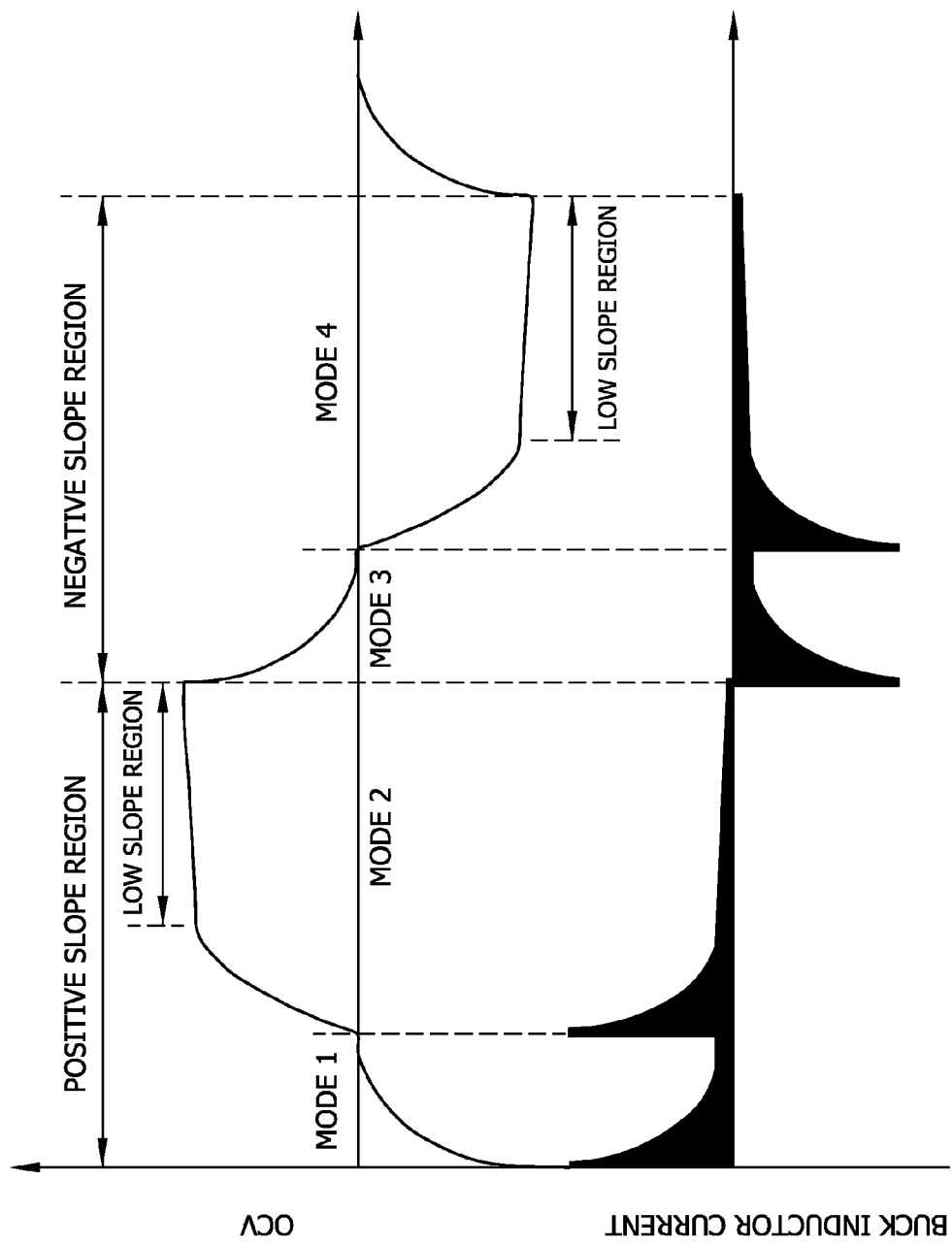
FIG. 3 is a plot of open circuit voltage (i.e., voltage across a lamp) along the vertical axis and buck inductor current over time along the horizontal axis in the ballast of FIG. 1 according to one embodiment of the invention.
Figure 4:
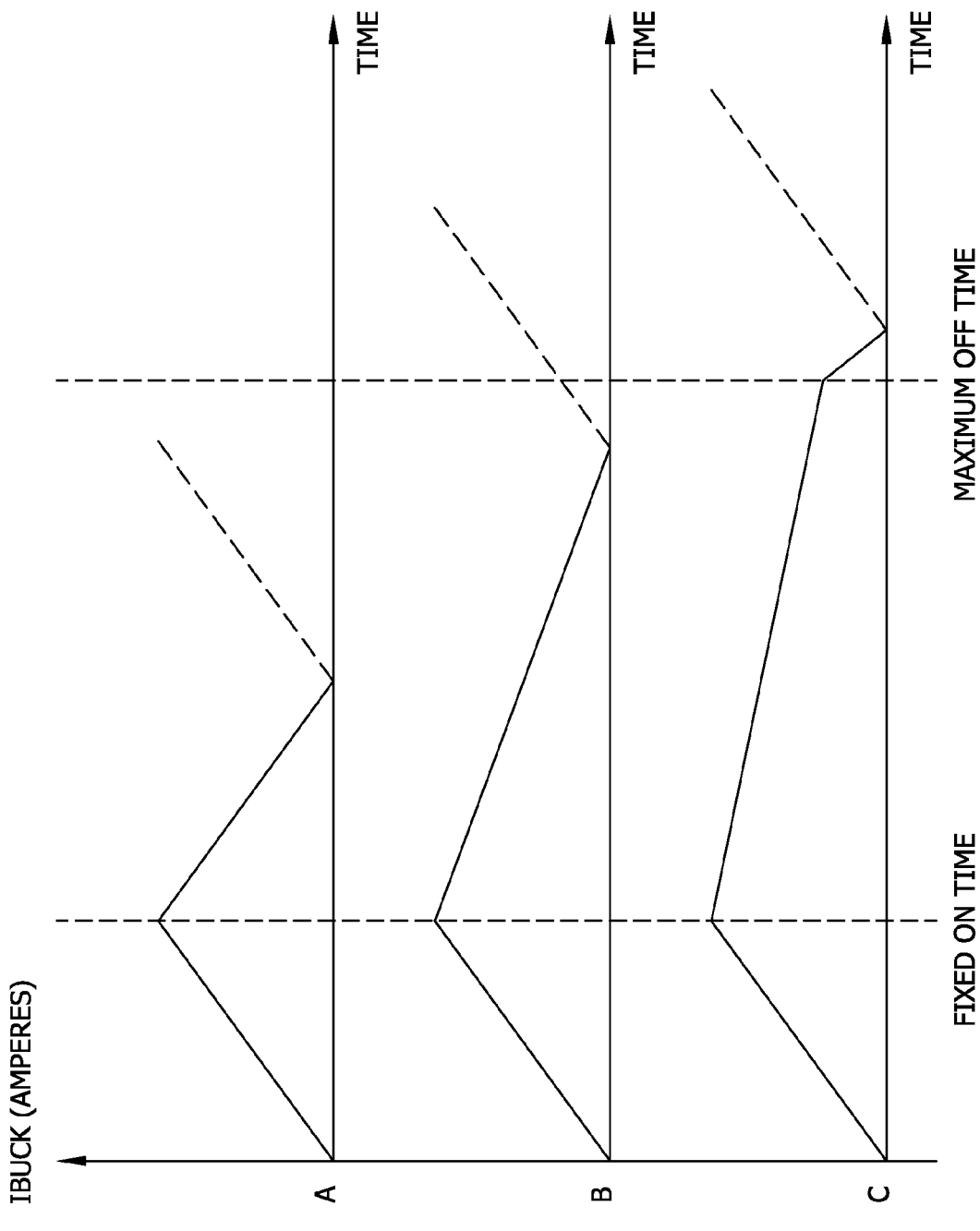
FIG. 4 a plot of three current profiles of a filter circuit (i.e., buck inductor current) on a common time scale according to one embodiment of the invention.

Referring to FIG. 3, in a first pre-ignition mode of operation, the first switch Q1 is cycled by the controller 200 at a relatively high frequency to discharge a negative voltage from the buck capacitor C2 (i.e., a negative OCV). A cycle within the first mode begins when the PWM unit 204 places and maintains the first switch Q1 in the ON state for a predetermined period of time while maintaining the other switches Q2, Q3, and Q4 in the OFF state before returning the first switch Q1 to the OFF state. The PWM unit 204 then times out after a maximum OFF time and begins the next cycle when a trigger signal is received from the trigger unit 206. The maximum OFF time is selected to allow the current in the buck inductor to fall to zero amperes before a next cycle begins as shown in plot A of FIG. 4. In one embodiment, the selected maximum OFF time is 10 microseconds. Referring to FIG. 4, the solid lines of the plots represent the current of the buck inductor during the present cycle, and the dashed lines of the plots represent the current of the buck inductor during the next cycle. In one embodiment of the invention, for example, the first switch Q1 is in the ON state (i.e., predetermined fixed ON time) for 2.5 microseconds, and in the OFF state for an actual time of about 16 microseconds for a frequency of about 54 kHz. The actual OFF time (i.e., time between turning OFF the first switch Q1 and beginning a new cycle) is determined by the difference between the DC bus voltage and the voltage across the buck capacitor C2 and varies from about 8 microseconds to 22 microseconds or a frequency of 41 kHz to 95 kHz during the first pre-ignition mode of operation. In one embodiment, the DC bus voltage is 460 volts and the voltage across the buck capacitor is 400 volts such that the voltage difference is 60 volts at the beginning of the first pre-ignition mode of operation. The current in the buck inductor rises to a peak and falls to zero amperes with the switching of the first switch Q1. The peak of the buck inductor current corresponds to the derivative of the OCV with respect to time (i.e., the time rate of change). That is, the current in the buck inductor has its highest peaks when the OCV is changing rapidly (e.g., at the beginning of each pre-ignition mode of operation). When the first switch Q1 is in the ON state, current flows from the positive node 106 of the DC bus through the first switch Q1 through the buck inductor to the buck capacitor C2, and from the buck capacitor C2 through the third freewheeling diode D3 back to the positive node 106. When the first switch Q1 is placed in the OFF state by the controller 200, the current freewheels from the negative node 110 through the second freewheeling diode D2 to the filter circuit 124, from the filter circuit 124 through the third freewheeling diode D3 to the positive node 106, and from the positive node 106 through the rectifier 104 and current sense resistor R5 to the negative node 110.

It is possible to discharge the buck capacitor C2 through the DC bus by switching on the first switch Q1 and the fourth switch Q4. However, the purpose of this first pre-ignition mode of operation is not only to discharge the negative voltage from the buck capacitor C2, but also to supply enough energy to the transformer T1 to keep the voltage of the secondary winding of the transformer T1 (i.e., a VCC input voltage of the controller 200) high enough to drive the controller 200. This is accomplished by maximizing a ripple current in the buck inductor (i.e., the primary coil of the first transformer T1).

In a second pre-ignition mode of operation, the first switch Q1 is cycled by the controller 200 at a relatively high frequency to accumulate a positive voltage in the buck capacitor C2. A cycle within the second mode begins when the PWM unit 204 places and maintains the first switch Q1 in the ON state for a predetermined period of time while maintaining the fourth switch Q4 in an ON state and the other switches Q2 and Q3 in the OFF state before returning the first switch Q1 to the OFF state. The PWM unit 204 then begins the next cycle when a trigger signal is received from the trigger unit 206 as shown in plot B of FIG. 4, or reaches a maximum OFF time as shown in plot C of FIG. 4. When the first switch Q1 is in the ON state, current flows from the positive node 106 of the DC bus through the first switch Q1 through the filter circuit 124 to the fourth switch Q4, and from the fourth switch through the negative node 110 of the DC bus, the current sense resistor R5, and the rectifier 104 back to the positive node 106 of the DC bus. When the first switch Q1 is placed in the OFF state by the controller 200, the current freewheels from the negative node 110 through the second freewheeling diode D2 to the filter circuit 124, and from the filter circuit 124 through the fourth switch Q4 back to the negative node 110. If the maximum OFF time of Q1 is reached before the current in the buck inductor falls to zero amperes as shown in plot C of FIG. 4, then the PWM unit 204 turns the fourth switch Q4 OFF until the buck inductor current falls to zero. Turning the fourth switch Q4 OFF causes the current in the buck inductor to reduce to zero amperes at a faster rate, and when the current reaches zero, the trigger unit 206 provides a trigger signal to the PWM unit 204, causing the PWM unit 204 to start a new cycle by turning on the first and fourth switches Q1 and Q4. This faster rate of buck inductor current reduction is approximately equal to the rate of buck inductor current reduction in the first pre-ignition mode of operation as shown in plot A of FIG. 4. When both the first switch Q1 and the fourth switch Q4 are in the OFF state, current flows from the negative node 110 through the second freewheeling diode D2 to the filter circuit 124, from the filter circuit 124 through the third freewheeling diode D3 to the positive node 106, and from the positive node 106 through the rectifier 104 and current sensing resistor R5 back to the negative node 110. It is possible to select the maximum OFF time to be long enough to allow the buck inductor current to fall to zero amperes within the maximum OFF time (i.e., without having to turn OFF the fourth switch to increase the rate of reduction of the buck inductor current). However, increasing the maximum OFF time brings the cycle frequency closer to a resonant frequency of the filter circuit 124 which can disrupt the ability of the controller 200 to accurately determine the OCV, inverter current, and buck inductor current, thus preventing the controller 200 from controlling the timing and operation of the switches Q1, Q2, Q3, and Q4 as described herein. Increasing the capacitance of the buck capacitor C2 and the inductance of the buck inductor would decrease the resonant frequency, but this would increase the size and cost of the buck inductor and buck capacitor. In one embodiment, for example, the first switch Q1 is in the ON state for 2.5 microseconds, the actual time the first switch Q1 is in the OFF state varies from about 4-15 microseconds, the selected maximum OFF time is 10 microseconds, and the fourth switch Q4 remains in the OFF state for a maximum of 12 microseconds following the selected maximum OFF time before a next cycle begins Referring again to FIG. 3, the duration of a low slope region of OCV controls positive peak OCV and OCV frequency.

In a third pre-ignition mode of operation, the second switch Q2 is cycled by the controller 200 at a relatively high frequency to discharge a positive voltage from the buck capacitor C2 (i.e., a positive OCV). A cycle within the third mode begins when the PWM unit 204 places and maintains the second switch Q2 in the ON state for a predetermined period of time while maintaining the other switches Q1, Q3, and Q4 in the OFF state before returning the second switch Q2 to the OFF state. The PWM unit 204 then times out after a selected maximum OFF time and begins the next cycle when a trigger signal is received from the trigger unit 206 (see plot A of FIG. 4). In one embodiment, the selected maximum OFF time is 10 microseconds. In one embodiment of the invention, for example, the second switch Q2 is in the ON state for 2.5 microseconds, and in the OFF state for an actual time of about 16 microseconds for a frequency of 54 kHz at the beginning of the third pre-ignition mode of operation. The actual OFF time (i.e., time between turning OFF the first switch Q1 and beginning a new cycle) is determined by the difference between the DC bus voltage and the voltage across the buck capacitor C2 and varies from about 8 microseconds to 22 microseconds or a frequency of 41 kHz to 95 kHz during the third pre-ignition mode of operation. In one embodiment, the DC bus voltage is 460 volts and the voltage across the buck capacitor is 400 volts such that the voltage difference is 60 volts at the beginning of the third pre-ignition mode of operation. When the second switch Q2 is in the ON state, current flows from the negative node 110 of the DC bus through the freewheeling diode D4 to the filter circuit 124, and from the filter circuit 124 through the second switch Q2 back to the negative node 110. When the second switch Q2 is placed in the OFF state by the controller 200, the current freewheels from the negative node 110 through the fourth freewheeling diode D4 to the filter circuit 124, from the filter circuit 124 through the first freewheeling diode D1 to the positive node 106, and from the positive node 106 through the rectifier 104 and current sense resistor R5 back to the negative node 110.

In a fourth pre-ignition mode of operation, the second switch Q2 is cycled by the controller 200 at a relatively high frequency to accumulate a negative voltage in the buck capacitor C2. A cycle within the fourth pre-ignition mode of operation begins when the PWM unit 204 places and maintains the second switch Q2 in the ON state for a predetermined period of time while maintaining the third switch Q3 in an ON state and the Q1 and Q4 switches in the OFF state before returning the second switch Q2 to the OFF state. The PWM unit 204 then begins the next cycle when a trigger signal is received from the trigger unit 206 as shown in plot B of FIG. 4, or reaches a maximum OFF time of Q2 as shown in plot C of FIG. 4. When the second switch Q2 is in the ON state, current flows from the positive node 106 of the DC bus through the third switch Q3 through the filter circuit 124 to the second switch Q2, and from the second switch Q2 through the negative node 110 of the DC bus, the current sense resistor R5, and the rectifier 104 back to the positive node 106 of the DC bus. When the second switch Q2 is placed in the OFF state by the controller 200, the current freewheels from the positive node 106 through the third switch Q3 to the filter circuit 124, and from the filter circuit 124 through the first freewheeling diode D1 back to the positive node 106. With the third switch Q3 in the ON state, the buck inductor current falls to zero at approximately the same rate as in the second pre-ignition mode of operation with the fourth switch Q4 in the ON state as shown in plot B of FIG. 4. If the maximum OFF time of Q2 is reached before the current in the buck inductor falls to zero amperes as shown in plot C of FIG. 4, then the PWM unit 204 turns the third switch Q3 OFF until the buck inductor current falls to zero. Turning the third switch Q3 OFF causes the current in the buck inductor to reduce to zero amperes at a faster rate, and when the current reaches zero, the trigger unit 206 provides a trigger signal to the PWM unit 204 causing the PWM unit 204 to start a new cycle by turning on the second and third switches Q2 and Q3. This faster rate of buck inductor current reduction is approximately equal to the rate of buck inductor current reduction in the first and third pre-ignition modes of operation (see plot A of FIG. 4). When both the second switch Q2 and the third switch Q3 are in the OFF state, current flows from the negative node 110 through the fourth freewheeling diode D4 to the filter circuit 124, from the filter circuit 124 through the first freewheeling diode D1 to the positive node 106, and from the positive node 106 through the rectifier 104 and current sensing resistor R5 back to the negative node 110. In one embodiment, for example, the second switch Q2 is in the ON state for 2.5 microseconds, the actual time of the second switch Q2 in the OFF state is 4-15 microseconds, the selected maximum OFF time is 10 microseconds, and the third switch Q3 remains in the OFF state for a maximum of 12 microseconds following the selected maximum OFF time before a next cycle begins or an error is determined. Referring again to FIG. 3, the duration of a low slope region of OCV controls a negative peak OCV and OCV frequency.

In one embodiment, the controller 200 operates the ballast 100 sequentially in each pre-ignition mode for a predetermined period of time (or until the controller 200 detects lamp 112 ignition and switches to a run-up and steady state operation). For example, in one embodiment, the first pre-ignition mode is 280 µs, the second pre-ignition mode is 680 µs, the third pre-ignition mode is 280 µs, and the fourth pre-ignition mode is 680 µs, which produces an OCV that is a periodic waveform having a 520 Hz frequency. In one embodiment, steady state operation of the ballast 100 comprises providing the filter circuit 124 with an approximately 160 Hz square wave having a 100 µs rise time. In another embodiment of the invention, the first pre-ignition mode of operation lasts until the OCV reaches zero volts from a predetermined negative peak voltage, the second pre-ignition mode of operation lasts until the OCV reaches a predetermined positive peak voltage, the third pre-ignition mode of operation lasts until OCV reaches zero volts from the predetermined positive peak voltage, and the fourth pre-ignition mode of operation lasts until OCV reaches a predetermined negative peak voltage.

Cycling or pulsing the switches in the pre-ignition modes of operation reduces an absolute value of a rate of change of the OCV, which ensures that sufficient energy is transferred to the secondary coil of the first transformer T1 from its primary coil (i.e., the buck inductor). Maintaining the fourth switch Q4 in the ON state during the second pre-ignition mode of operation and maintaining the third switch Q3 in the ON state during the fourth pre-ignition mode of operation further reduces or minimizes the absolute value of the rate of change of the OCV by breaking up the OCV transition from negative peak voltage to positive peak voltage at zero volts and from positive peak voltage to negative peak voltage at zero volts. In other words, each of the two transitions is broken into two transitions in order to maximize the integral of the absolute value of the derivative of the OCV over each half period (i.e., the average current through the buck inductor in each half period).

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

Having described aspects of the invention in detail, it will be apparent that modifications and variations are possible without departing from the scope of aspects of the invention as defined in the appended claims. As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A ballast for providing power to a lamp, said ballast comprising:
    a direct current (DC) bus having a positive node and a negative node;
    a first switch having a high side, a control terminal, and a low side, wherein the high side of the first switch is connected to the positive node of the DC bus;
    a second switch having a high side, a control terminal, and a low side, wherein the low side of the second switch is connected to the negative node of the DC bus, and the high side of the second switch is connected to the low side of the first switch forming a first midpoint;
    a third switch having a high side, a control terminal, and a low side, wherein the high side of the third switch is connected to the positive node of the DC bus;
    a fourth switch having a high side, a control terminal, and a low side, wherein the low side of the fourth switch is connected to the negative node of the DC bus, and the high side of the fourth switch is connected to the low side of the third switch forming a second midpoint;
    a filter circuit connected between the first midpoint and the second midpoint, said filter circuit comprising:
        a capacitor connected in parallel with the lamp; and
        a transformer having a buck inductor as a primary winding and having a secondary winding, said buck inductor connected in series with the capacitor;
    a controller connected to the control terminals of the first, second, third, and fourth switches for controlling the first, second, third, and fourth switches to provide an open circuit voltage across the lamp prior to ignition of the lamp, wherein the controller receives power from the buck inductor via the secondary winding of the transformer.

2. The ballast of claim 1 further comprising:
    a first freewheeling diode having a cathode and an anode, wherein the cathode is connected to the high side of the first switch, and the anode is connected to the low side of the first switch;
    a second freewheeling diode having a cathode and an anode, wherein the cathode is connected to the high side of the second switch, and the anode is connected to the low side of the second switch;
    a third freewheeling diode having a cathode and an anode, wherein the cathode is connected to the high side of the third switch, and the anode is connected to the low side of the third switch; and
    a fourth freewheeling diode having a cathode and an anode, wherein the cathode is connected to the high side of the fourth switch, and the anode is connected to the low side of the fourth switch.

3. The ballast of claim 1 wherein the controller controls the first, second, third, and fourth switches in a first pre-ignition mode, a second pre-ignition mode, a third pre-ignition mode, and a fourth pre-ignition mode prior to ignition of the lamp, wherein:
    in the first pre-ignition mode, the controller controls the first, second, third, and fourth switches to discharge a negative voltage from the capacitor;
    in the second pre-ignition mode, the controller controls the first, second, third, and fourth switches to accumulate a positive voltage in the capacitor;
    in the third pre-ignition mode, the controller controls the first, second, third, and fourth switches to discharge a positive voltage from the capacitor; and
    in the fourth pre-ignition mode, the controller controls the first, second, third, and fourth switches to accumulate a negative voltage in the capacitor.

4. The ballast of claim 3 wherein in the first pre-ignition mode:
    the controller maintains each of the second, third, and fourth switches in an OFF state via the control terminals of each of the respective switches, and
    the controller cycles the first switch, said cycling comprising:
        maintaining the first switch in an ON state via the control terminal of the first switch for a predetermined period of time, and
        maintaining the first switch in an OFF state via the control terminal of the first switch until either a current through the buck inductor falls to zero amperes or a first maximum OFF time is reached, wherein the first maximum OFF time is selected to allow enough time for the buck inductor current to fall to zero amperes under normal pre-ignition operation.

5. The ballast of claim 3 wherein in the second pre-ignition mode:
    the controller maintains each of the second and third switches in an OFF state via the control terminals of each of the respective switches,
    the controller maintains the fourth switch in an ON state via the control terminal of the fourth switch,
    the controller cycles the first switch, said cycling comprising:
        maintaining the first switch in an ON state via the control terminal of the first switch for a predetermined period of time, and
        maintaining the first switch in an OFF state via the control terminal of the first switch until either a current through the buck inductor falls to zero amperes or a second maximum OFF time is reached, wherein if the maximum OFF time is reached, the controller turns the fourth switch OFF until the current through the buck inductor falls to zero amperes.

6. The ballast of claim 3 wherein in the third pre-ignition mode:
    the controller maintains each of the first, third, and fourth switches in an OFF state via the control terminals of each of the respective switches, and the controller cycles the second switch, said cycling comprising:
maintaining the second switch in an ON state via the control terminal of the second switch for a predetermined period of time, and
maintaining the second switch in an OFF state via the control terminal of the second switch until either a current through the buck inductor falls to zero amperes or a third maximum OFF time is reached, wherein the third maximum OFF time is selected to allow enough time for the buck inductor current to fall to zero amperes under normal pre-ignition operation.

7. The ballast of claim 3 wherein in the fourth pre-ignition mode:
the controller maintains each of the first and fourth switches in an OFF state via the control terminals of each of the respective switches,
the controller maintains the third switch in an ON state via the control terminal of the third switch,
the controller cycles the second switch, said cycling comprising:
maintaining the second switch in an ON state via the control terminal of the second switch for a predetermined period of time, and
maintaining the second switch in an OFF state via the control terminal of the second switch until either a current through the buck inductor falls to zero amperes or a fourth maximum OFF time is reached, wherein if the maximum OFF time is reached, the controller turns the third switch OFF until the current through the buck inductor falls to zero amperes.

8. The ballast of claim 3 wherein:
the first pre-ignition mode begins with the capacitor charged to a negative peak voltage and ends with the capacitor voltage discharged to zero volts, wherein the first pre-ignition mode lasts for a first predetermined time,
the second pre-ignition mode begins with the capacitor discharged to zero volts from the negative peak voltage and ends with the capacitor charged to a positive peak voltage, wherein the second pre-ignition mode lasts for a second predetermined time,
the third pre-ignition mode begins with the capacitor charged to the positive peak voltage and ends with the capacitor voltage discharged to zero volts, wherein the third pre-ignition mode lasts for a third predetermined time, and
the fourth pre-ignition mode begins with the capacitor discharged to zero volts from the positive peak voltage and ends with the capacitor is charged to the negative peak voltage, wherein the fourth pre-ignition mode lasts for a fourth predetermined time, the first predetermined time is equal to the third predetermined time, and the second predetermined time is equal to the fourth predetermined time.

9. The ballast of claim 1 wherein the switches are mosfets, wherein the control terminal is a gate of the mosfet, the high side is a drain of the mosfet, and the low side is a source of the mosfet, and wherein after ignition of the lamp, the controller controls the switches to provide run-up and steady state power to the lamp and the controller continues to receive power from the buck inductor via the secondary winding of the transformer.

10. The ballast of claim 1 wherein the controller comprises:
a pulse width modulation unit for controlling the first, second, third, and fourth switches as a function of a set of control parameters, wherein the pulse width modulation unit pulses a selected one of the first, second, third, and fourth switches as a function of the control parameters to begin a cycle and places the first, second, third, and fourth switches in an OFF state unless the pulse width modulation unit receives a trigger signal within a maximum OFF time, and wherein the pulse width modulation begins a next cycle in response to receiving the trigger signal by pulsing the selected switch;
a trigger unit for monitoring a current through the buck inductor and providing the trigger signal to the pulse width modulation unit in response to the current through the buck inductor falling to zero amperes, wherein the current through the buck inductor is determined from a voltage across the buck inductor;
a digital control unit for controlling a pre-ignition operating mode of the ballast by providing the control parameters to the pulse width modulation unit, wherein the digital control unit determines the pre-ignition operating mode of the ballast as a function of the open circuit voltage across the lamp; and
a rectifier for receiving the power from the buck inductor via the secondary of the transformer and providing DC power to the pulse width modulation unit, the trigger unit, and the digital control unit.

11. A method of operating a ballast to provide an open circuit voltage across a lamp prior to ignition of the lamp, wherein the ballast comprises a direct current (DC) bus, a controller, a first switch, a second switch, a third switch, a fourth switch, and a filter circuit including a capacitor in series with a buck inductor, each of said switches having a control terminal, a high side, and a low side, and wherein the controller controls each of the switches via their respective control terminals, said method comprising:
cycling the first switch to discharge a negative voltage from the capacitor in a first pre-ignition mode of operation;
cycling the first switch of the ballast to accumulate a positive voltage in the capacitor in a second pre-ignition mode of operation;
cycling the second switch of the ballast to discharge the positive voltage from the capacitor in a third pre-ignition mode of operation; and
cycling the second switch of the ballast to accumulate a negative voltage in the capacitor in a fourth pre-ignition mode of operation, wherein in the fourth pre-ignition mode, the third switch is held in an ON state, and in the second pre-ignition mode, a fourth switch of the ballast is held in an ON state;
wherein a primary winding of a transformer is the buck inductor and wherein the controller receives power from a secondary winding of the transformer.

12. The method of claim 11 wherein in the first pre-ignition mode:
the controller maintains each of the second, third, and fourth switches in an OFF state via the control terminals of each of the respective switches, and
said cycling the first switch comprises:
maintaining the first switch in an ON state via the control terminal of the first switch for a predetermined period of time, and
maintaining the first switch in an OFF state via the control terminal of the first switch until either a current through the buck inductor falls to zero amperes or a first maximum OFF time is reached, wherein the first maximum OFF time is selected to allow enough time for the buck inductor current to fall to zero amperes under normal pre-ignition operation.

13. The method of claim 11 wherein in the second pre-ignition mode:
    the controller maintains each of the second and third switches in an OFF state via the control terminals of each of the respective switches,
    the controller maintains the fourth switch in an ON state via the control terminal of the fourth switch, and
    said cycling the first switch comprises:
        maintaining the first switch in an ON state via the control terminal of the first switch for a predetermined period of time, and
        maintaining the first switch in an OFF state via the control terminal of the first switch until either a current through the buck inductor falls to zero amperes or a second maximum OFF time is reached, wherein if the second maximum OFF time is reached, the controller turns the fourth switch OFF until the current through the buck inductor falls to zero amperes.

14. The method of claim 11 wherein in the third pre-ignition mode:
    the controller maintains each of the first, third, and fourth switches in an OFF state via the control terminals of each of the respective switches, and
    said cycling the second switch comprises:
        maintaining the second switch in an ON state via the control terminal of the second switch for a predetermined period of time, and
        maintaining the second switch in an OFF state via the control terminal of the second switch until either a current through the buck inductor falls to zero amperes or a third maximum OFF time is reached, wherein third maximum OFF time is selected to allow enough time for the buck inductor current to fall to zero amperes under normal pre-ignition operation.

15. The method of claim 11 wherein in the fourth pre-ignition mode:
    the controller maintains each of the first and fourth switches in an OFF state via the control terminals of each of the respective switches,
    the controller maintains the third switch in an ON state via the control terminal of the third switch, and
    said cycling the second switch comprises:
        maintaining the second switch in an ON state via the control terminal of the second switch for a predetermined period of time, and
        maintaining the second switch in an OFF state via the control terminal of the second switch until either a current through the buck inductor falls to zero amperes or a third maximum OFF time is reached, wherein if the third maximum OFF time is reached, the controller turns the third switch OFF until the current through the buck inductor falls to zero amperes.

16. The method of claim 11 wherein:
    the DC bus of the ballast has a positive node and a negative node;
    the high side of the first switch is connected to the positive node of the DC bus;
    the low side of the second switch is connected to the negative node of the DC bus, and the high side of the second switch is connected to the low side of the first switch forming a first midpoint;
    the high side of the third switch is connected to the positive node of the DC bus;
    the low side of the fourth switch is connected to the negative node of the DC bus, and the high side of the fourth switch is connected to the low side of the third switch forming a second midpoint; and
    the filter circuit is connected between the first midpoint and the second midpoint, wherein the capacitor is connected in parallel with the lamp, and the buck inductor is connected in series with the capacitor.

17. The method of claim 16 wherein the ballast further comprises
    a first freewheeling diode having a cathode and an anode, wherein the cathode is connected to the high side of the first switch, and the anode is connected to the low side of the first switch;
    a second freewheeling diode having a cathode and an anode, wherein the cathode is connected to the high side of the second switch, and the anode is connected to the low side of the second switch;
    a third freewheeling diode having a cathode and an anode, wherein the cathode is connected to the high side of the third switch, and the anode is connected to the low side of the third switch; and
    a fourth freewheeling diode having a cathode and an anode, wherein the cathode is connected to the high side of the fourth switch, and the anode is connected to the low side of the fourth switch.

18. The method of claim 11 wherein the switches are mosfets, wherein the control terminal is a gate of the mosfet, the high side is a drain of the mosfet, and the low side is a source of the mosfet, and wherein after ignition of the lamp, the controller controls the switches to provide run-up and steady state power to the lamp and the controller continues to receive power from the buck inductor via the secondary winding of the transformer.

19. The method of claim 11 wherein the controller comprises:
    a pulse width modulation unit for controlling the first, second, third, and fourth switches as a function of a set of control parameters, wherein the pulse width modulation unit pulses a selected one of the first, second, third, and fourth switches as a function of the control parameters to begin a cycle and places the first, second, third, and fourth switches in an OFF state unless the pulse width modulation unit receives a trigger signal within a maximum OFF time, and wherein the pulse width modulation begins a next cycle in response to receiving the trigger signal by pulsing the selected switch;
    a trigger unit for monitoring a current through the buck inductor and providing the trigger signal to the pulse width modulation unit in response to the current through the buck inductor falling to zero amperes, wherein the current through the buck inductor is determined from a voltage across the buck inductor;
    a digital control unit for controlling a pre-ignition operating mode of the ballast by providing the control parameters to the pulse width modulation unit, wherein the digital control unit determines the pre-ignition operating mode of the ballast as a function of the open circuit voltage across the lamp; and
    a rectifier for receiving the power from the buck inductor via the secondary of the transformer and providing DC power to the pulse width modulation unit, the trigger unit, and the digital control unit.

20. A method for use with a ballast for providing power to a lamp, said ballast comprising:
    a direct current (DC) bus having a positive node and a negative node;

a first switch having a high side, a control terminal, and a low side, wherein the high side of the first switch is connected to the positive node of the DC bus;

a second switch having a high side a control terminal, and a low side, wherein the low side of the second switch is connected to the negative node of the DC bus, and the high side of the second switch is connected to the low side of the first switch forming a first midpoint;

a third switch having a high side, a control terminal, and a low side, wherein the high side of the third switch is connected to the positive node of the DC bus;

a fourth switch having a high side, a control terminal, and a low side, wherein the low side of the fourth switch is connected to the negative node of the DC bus, and the high side of the fourth switch is connected to the low side of the third switch forming a second midpoint; and a filter circuit connected to the lamp and connected between the first midpoint and the second midpoint, said method comprising:

applying an open circuit voltage (OCV) to the lamp from the ballast prior to ignition of the lamp;

thereafter cycling the first switch of the ballast to increase the OCV applied to the lamp from a negative peak voltage to zero volts, wherein said cycling of the first switch reduces an absolute value of a rate of change of the OCV applied to the lamp;

thereafter maintaining the fourth switch of the ballast in an ON state while cycling the first switch to increase the OCV applied to the lamp from zero volts to a positive peak voltage, wherein said maintaining the fourth switch while cycling of the first switch reduces the absolute value of the rate of change of the OCV applied to the lamp;

thereafter cycling the second switch of the ballast to decrease the OCV applied to the lamp from the positive peak voltage to zero volts, wherein said cycling of the second switch reduces the absolute value of the rate of change of the OCV applied to the lamp;

thereafter maintaining the third switch in an ON state while cycling the second switch to decrease the OCV applied to the lamp from zero volts to the negative peak voltage, wherein said maintaining the third switch while cycling the second switch reduces the absolute value of the rate of change of the OCV applied to the lamp.

21. The method of claim 20 wherein said open circuit voltage comprises a periodic waveform, wherein the ballast provides an open circuit voltage to the lamp prior to ignition of the lamp, and wherein the ballast cycles the switches in order to maximize the integral of the absolute value of the derivative of the open circuit voltage during each half period of the periodic waveform.

\* \* \* \* \*